May 26, 1953  G. A. STARBIRD  2,640,129
TEMPERATURE RESPONSIVE SWITCH
Filed April 15, 1950
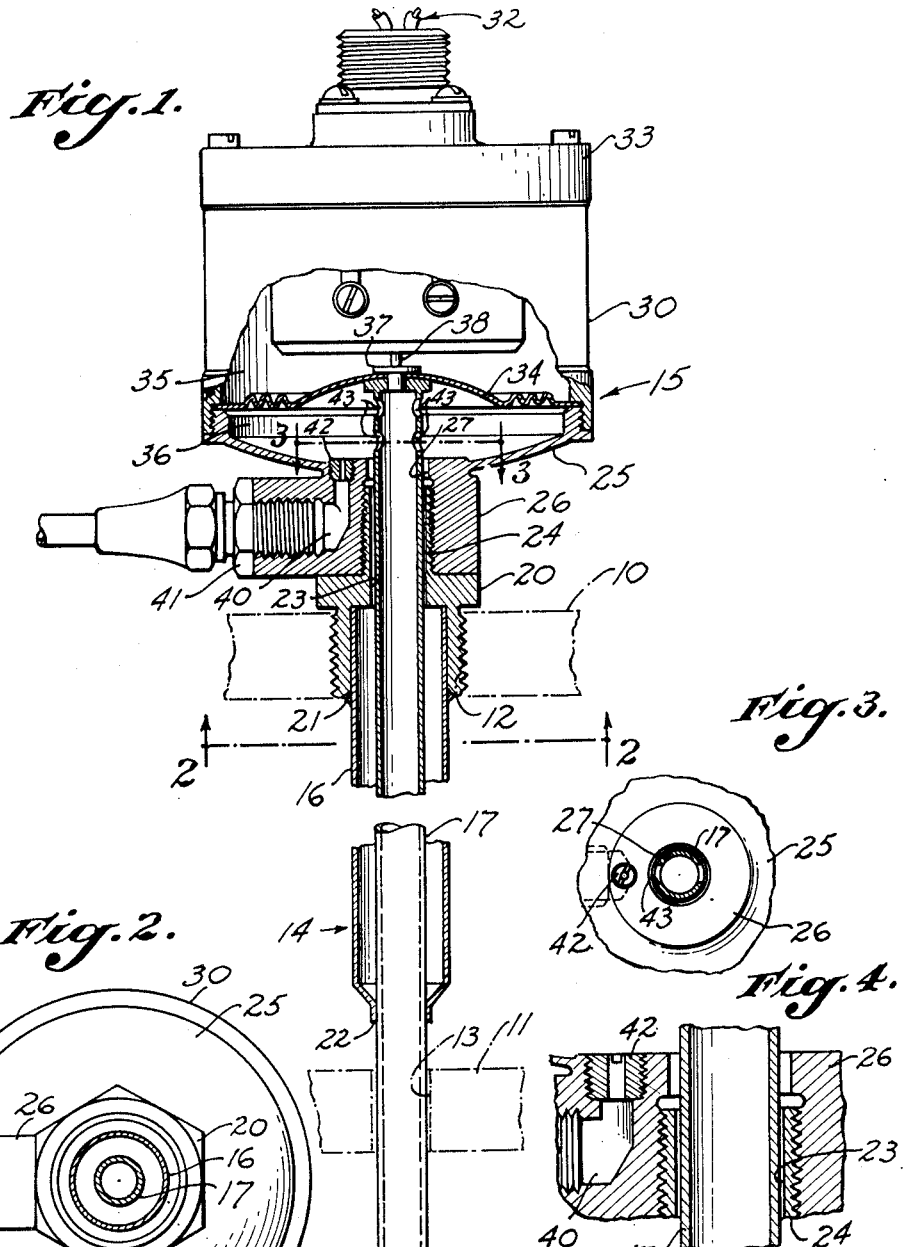
GEORGE A. STARBIRD
INVENTOR.
BY Fulwider & Mattingly
ATTORNEYS.

Patented May 26, 1953

2,640,129

UNITED STATES PATENT OFFICE 2,640,129

TEMPERATURE RESPONSIVE SWITCH

George A. Starbird, Agoura, Calif., assignor to Meletron Corporation, Los Angeles, Calif., a corporation of California Application April 15, 1950, Serial No. 156,145

9 Claims. (Cl. 200—137)

My invention relates generally to temperature responsive switches, and more particularly to switches of this type adapted to be controlled by the temperature of a stream of fluid.

In many industrial processes, it is important that the temperature of a large column of gas be measured in order to control various steps of a process. For example, the temperature of the gas in a flue or stack is often used to control the amount of heat that is applied elsewhere in a process, and consequently the average temperature of this gas is quite important. In many applications, it is important that the flow of the gas not be unduly restricted, and consequently a passageway having a large cross-sectional area is necessary. Under these circumstances, it is important that the temperature sensing element not introduce any unnecessary turbulence or act as a restriction in the passageway. Additionally, since the average temperature of the gas must be determined, a sensing probe that determines the temperature at only a single point in the flue is not satisfactory. Furthermore, where high temperatures are to be measured, the surrounding elements are generally heated so that the customary thermal expansion type sensing elements do not perform satisfactorily.

It is therefore a major object of my invention to provide a temperature responsive switch particularly adapted to measure the average temperature of a column of fluid having a relatively large cross-sectional area.

Another object of my invention is to provide a switch of this type that introduces a minimum of turbulence into the stream of fluid and does not unduly restrict the passage thereof.

It is a further object of my invention to provide such a switch that is not materially affected by the temperature of the attached and surrounding parts, but is affected only by the temperature of the fluid.

Still another object of my invention is to provide a switch suitable for operation at very high temperatures where customary materials fail or are impractical.

It is a still further object of my invention to provide a switch having these characteristics that is simple and reliable in operation, and requires a minimum of auxiliary equipment.

These and other objects and advantages of my invention will become apparent from the following description of a preferred form thereof, and from the drawings illustrating that form in which:

Fig. 1 is a cross-sectional view, taken along the axis of the sensing probe, of a switch constructed in accordance with my invention;

Fig. 2 is a sectional view taken on the line 2—2 of Fig. 1, indicating the construction of the sensing probe;

Fig. 3 is a view taken on the line 3—3 of Fig. 1 and showing the relative position of the expansion orifice and the inner member of the sensing probe; and Fig. 4 is a fragmentary enlarged cross-sectional view of a portion of Fig. 1, and showing the location of the expansion orifice in relation to the central element of the probe.

Broadly, the switch of my invention includes a pair of concentric tubes that form the sensing probe, the outer tube being of a material that has a fairly high thermal coefficient of expansion, while the inner tube has a very small thermal coefficient of expansion. The tubes are substantially coextensive in length, and at one end, the tubes are firmly bonded or held together, while the outer tube is anchored at the opposite end. The corresponding end of the inner tube thus moves with respect to the anchored end of the outer tube, and this movement is used to operate an electrical switch of more or less conventional construction.

Referring now to the drawings and particularly to Fig. 1 thereof, the numeral 10 indicates one wall of a conduit adapted to carry a fluid whose temperature is to be measured. The opposite wall of the conduit is indicated by the numeral 11, it being understood that the conduit and its method of fabrication is in and of itself forms no part of the present invention. An aperture 12, preferably threaded, is formed in the wall 10 of the conduit, and an aligned aperture 13 is formed in the opposite wall 11. A sensing probe 14 extends between these two apertures, and operates a switch contained within a housing 15 mounted exteriorly of the conduit wall 10.

The sensing probe 14 includes an outer tubular member 16 and a concentric and substantially coextensive inner tubular member 17, both of these members being of materials adapted to withstand the temperatures to which they are normally subjected. The outer tubular member 16 is anchored to the wall 10 by means of a threaded plug 20 fitting within the aperture 12 and having a recess adapted to receive the outer tubular member. To prevent any possibility of movement between the plug 20 and the outer tubular member 16, the two are preferably welded together as indicated at 21, so that the outer tube is positively anchored with respect to the plug and to the wall 10 of the conduit. At its opposite end, the outer tube 16 is firmly connected to the inner tubular member 17, as by swaging and welding at the point 22. The outer tube 16 extends substantially the entire distance between the walls 10 and 11 of the conduit, and the inner tubular member 17 extends beyond the end of the outer tube to pass through the aperture 13 in the wall 11. As will hereinafter become apparent, the inner tube 17 makes a sliding fit with the wall 11 so that the tube is free to move along its axis, while being held against any substantial movement perpendicular thereto.

It will be seen that this construction supports the outer tube 16 at each end, while the inner tube 17 is supported at one end by the wall 11 of the conduit. At its opposite end, the inner tube 17 extends beyond the end of the outer tube 16 and passes with a sliding fit through an aperture 23 centrally located in the exterior end of the plug 20 and continues on into the housing 15.

To support the housing 15, the plug 20 is provided with a threaded boss 24 surrounding the aperture 23 and projecting outwardly, away from the wall 10 of the conduit. A base 25 of the housing 15 is connected to the boss 24 by a cooperating boss 26 having an aperture 27 aligned with the aperture 23 through which the inner tube 17 passes. As indicated in Fig. 2, the base member 25 is preferably circular, and is threadedly connected at its edges to a body portion 30 of the housing 15. A snap action switch 31, preferably of the miniature type, is mounted within the main body 30 of the housing 15, and is provided with suitable electrical connections 32 passing through a cap 33 closing the upper end of the housing.

Between the base member 25 and the switch 31 is a flexible diaphragm 34 that divides the housing 15 into two compartments, an upper compartment 35 in which the switch 31 is located, and a lower compartment 36 adjacent the base member 25. The diaphragm 34 acts as a flexible seal between the compartments 35 and 36, and the adjacent end of the inner tubular member 17 is firmly connected to the center of the diaphragm by means such as a rivet 37 or similar member to flex the diaphragm. As indicated, the rivet 37 extends through the diaphragm 34, and is located adjacent an actuating member 38 of the switch 31. In this manner, as the end of the inner tubular member 17 and the attached rivet 37 move nearer the switch 31, the switch is actuated to close a circuit, for example, while movement of the rivet away from the switch, causes the switch to open the circuit. It is to be understood, of course, that movement of the rivet 37 toward the switch 31 may act to open the circuit instead of closing it, as will be understood by those familiar with such switches.

In order that the switch may operate in a consistent manner, it is desirable that the temperature of the inner tubular member 17 remain substantially constant regardless of the temperature of the fluid passing through the conduit. To accomplish this, I provide for the passage of a cooling stream of fluid, such as air, through the length of the inner tubular member 17. While a liquid may be used for this purpose, it generally is less satisfactory, because of the auxiliary equipment that must be provided. Consequently, I favor the use of a gaseous material, though it is to be understood that any suitable fluid may be used.

Extending through the boss 26 of the base member 25 is a passageway 40 that extends between the lower chamber 36 and the exterior of the housing 15. In the form shown, the passageway 40 leads to a fluid connection 41 on the exterior of the boss 26, the passageway terminating at the upper end of the boss adjacent the aperture 27 therein. An orifice plug 42 provides a restriction at the inner end of the passageway 40, to act as an expansion control member, and it will be appreciated that air or other gaseous material under pressure will expand as it enters the lower chamber 36, thereby undergoing a temperature reduction.

The end of the inner tubular member 17 within the lower compartment 36 is provided with holes 43 forming a fluid connection between the compartment and the interior of the inner tubular member. The other end of the inner tube 17, projecting through the wall 11 of the conduit, is open, and thus cooling air passes from the lower compartment 36, through the hole 43, along the interior of the tube 17, and out its opposite end.

It is important that the end of the inner tubular member 17 adjacent the wall 11 of the conduit be kept open at all times, since an obstruction would prevent the free discharge of air from the tubular member, thus increasing the pressure within the lower chamber 36 and thereby stressing the diaphragm 34 in a manner tending to operate the switch 31 by this pressure alone. Additionally, as the pressure increases within the lower chamber 36, there is less expansion of the gas as it leaves the orifice plug 42, and consequently less cooling of the inner tubular member 17. For these reasons, the tube 17 should be unobstructed at all times.

While there may be a certain amount of leakage of cooled air or gas through the apertures 27 and 23 into the space between the outer tubular member 16 and the inner tubular member 17, the amount of this leakage will be quite small, and there will be no constant flow of air around the exterior of the inner tube 17, since the outer tube is preferably sealed to the inner tube at the point 22.

In the operation of my improved switch, air or other suitable gaseous material is supplied under pressure to the fluid connector 41 by suitable means (not shown) such as a compressor, storage tank, or similar device. The air may be warm or even hot, but its temperature should remain relatively constant during the period of operation of the switch. As the air passes from the passageway 40 into the lower chamber 36, it expands and is cooled, the cooled air thereafter passing through the interior of the inner tubular member 17 and out the opposite end thereof. This end, it will be recalled, is free to move axially within the aperture 13 in the wall 11 of the conduit, and the other end is likewise free to move axially through the apertures 23 and 27 in the plug 20 and boss 26 of the base member 25.

As the gas or other fluid is moved through the conduit having walls 10 and 11, it impinges upon the outer tubular member 16, with a resulting heat transfer so that the temperature of this outer tubular member is substantially equal to that of the fluid surrounding it. Normally this temperature will be relatively high, and may reach a temperature, for example, of 2400° F. The material forming the outer tubular member

16 is selected to withstand the temperature to which it may reasonably be expected to reach, and it is also selected so that it has a relatively high temperature coefficient of expansion. Certain of the iron-nickel-chrome alloys meet these requirements, one of them, designated by the American Metals Society as AMS 5532, being very satisfactory and having a thermal coefficient of expansion of approximately $9 \times 10^{-5}$. The inner tubular member is selected from the group of alloys that are likewise capable of withstanding high temperatures, but is selected so that it has a very low thermal coefficient of expansion. Some of the nickel-iron compounds meet these requirements, and one of them, designated by the tradename of "Invar" has been found very satisfactory.

While it is not essential that the inner tubular member 17 be constructed of a material having substantially no expansion as it is heated, there should be a considerable difference in thermal expansion between it and the outer tubular member 16. In this manner, the maximum movement of the rivet 37 is secured for a given temperature change. In this connection, it will be noted that since the inner tubular member 17 has a lower coefficient of expansion than the outer tubular member 16, movement of the rivet 37 is insured even if no cooling is provided. Additionally, the flow of cooling fluid from the lower chamber 36 through the inner tubular member maintains this member at a lower temperature than that of the outer tubular member 16, and consequently an even greater movement or displacement is secured for a given change in temperature. If the inner tubular member 17 had a coefficient of expansion that was zero, the need for the stream of cooling fluid would be materially reduced. However, so far as I am aware, there are no readily available materials having a zero coefficient of thermal expansion, and also meeting the other requirements, such as resistance to high temperatures. Consequently, a material is selected that will withstand the high temperature, while at the same time having a very low coefficient of thermal expansion.

While it would theoretically be possible to make the outer tubular member 16 of material having a small thermal expansion and the inner tubular member of a material having a large thermal expansion, this being the reverse of the form preferred heretofore described, the cooling fluid passing through the inner tubular member would normally prevent that member from responding accurately to the temperature of the material within the conduit defined by the walls 10 and 11. If the stream of cooling fluid were omitted, somewhat better results would be obtained, but even if holes were formed in the outer tubular member 16 to permit the direct transfer of heat between the fluid within the conduit and the inner tubular member 17, the problem of turbulence and uniform heating of the members would remain. Consequently, these other forms are generally not so satisfactory as the preferred form described.

Even in the preferred form, the necessity of uniform heat transfer, particularly at hiih velocities, requires that special precautions be taken. For example, I have found it very desirable to provide transversely extending beads or protuberances on the outer tubular member 16, extending around the downstream side of the member to furnish a greater area so that the heat from the fluid is more properly and evenly transferred to the outer tubular member. In some instances, it may even be desirable to form the outer member with a streamline cross-section instead of a circular cross-section, in order to decrease the drag it is subjected to by reason of the turbulence within the stream of fluid. However, these problems only arise where very high velocities are encountered in the fluid, and in most applications the beads or protuberances may be omitted as well as the streamline cross-section.

The switch 31 may be used to control any desired operation, either directly or through relay means, as necessity may dictate. The switch 31, in and of itself, forms no part of my present invention, nor does the apparatus or system controlled by it. However, it should be noted that the stream of cooling fluid within the lower chamber 36 aids in cooling the switch 31 and also the material and equipment surrounding it, so that the life of the switch is increased and the reliability of the unit is materially improved.

While I have shown and described a preferred form of my invention, it will be apparent that modification may be made therein without exceeding the scope of my disclosure. Consequently, I do not wish to be restricted to the particular form or arrangement of parts herein described and shown, except as limited by my claims.

I claim:

1. A temperature actuated switch which includes: a mounting; a switch attached to said mounting; a first tubular member rigidly attached to said mounting and extending therefrom into a medium whose temperature is to be measured; a second member, within said first tubular member, having a coefficient of thermal expansion different from that of said first tubular member, rigidly connected to said first tubular member at a point remote from said mounting and extending therefrom to a point adjacent said switch; means including a passageway through the interior of said second member for positively conducting fluid therethrough at all times to maintain said second member at a substantially constant temperature despite variations in the temperature of said medium, said fluid passing but once through said second member before being discharged therefrom at a point remote from said mounting; and means on the end of said second member positioned to bear against the actuating member of said switch to operate the latter.

2. A temperature actuated switch which includes: a mounting; a switch attached to said mounting; a first tubular member having a relatively large coefficient thermal expansion, rigidly attached to said mounting and extending therefrom into a medium whose temperature is to be measured; a second tubular member, within said first tubular member, having a relatively small coefficient of thermal expansion, rigidly connected to said first tubular member at a point remote from said mounting and extending therefrom to a point adjacent said switch, said second tubular member being rigidly held only at said point of connection to said first tubular member; means for maintaining said second tubular member at a substantially constant temperature by the provision of a positive flow of cooling fluid through only the interior of said second tubular member at all times, said cooling fluid making but a single passage through said second tubular member before being exhausted therefrom, despite variations in the temperature of said medium; and means on the end of said second tubular member positioned to bear against the actuating member of said switch to operate the latter.

3. A temperature actuated switch which includes: a housing; a switch mounted on said housing; a first member rigidly attached to said housing and extending therefrom into a medium whose temperature is to be measured; a second member having a coefficient of thermal expansion different from that of said first member, rigidly connected to said first member near the end of the latter and extending therefrom to a point adjacent said switch, said second member being rigidly held only at said point of connection to said first member; an expansion chamber within said housing having an orifice for admitting gas under pressure thereinto, said orifice and said chamber cooperating to insure the expansion and attendant cooling of said gas as it enters said chamber; means including a passageway through said second member for conducting said gas from said chamber through said second member, thereby maintaining said second member at a substantially constant temperature despite variations in the temperature of said medium; and means on the end of said second member positioned to bear against the actuating member of said switch to operate the latter.

4. A temperature actuated switch which includes: a housing; a switch mounted in said housing; a first member having a relatively large coefficient of thermal expansion, extending from said housing into a medium whose temperature is to be measured; a second member having a relatively small coefficient of thermal expansion, rigidly connected to said first member at a point remote from said switch, one of said members being rigidly connected to said housing and the other extending to a point adjacent said switch; a flexible diaphragm within said housing between said switch and the end of said member adjacent thereto, thereby forming a first compartment in which said end of said member is located, and a second compartment in which said switch is located; means for admitting a gas into said first compartment, said means including an orifice through which said gas passes as it enters said compartment whereby said gas is expanded and cooled; means including a passageway through said second member for conducting said gas from said first compartment through said second member, thereby maintaining said second member at a substantially constant temperature despite variation in the temperature of said medium; and means on said adjacent end of said member positioned to bear against said diaphragm and flex the latter to move the actuating member of said switch to operate the same.

5. A temperature actuated switch which includes: a housing; a switch mounted in said housing; a first tubular member rigidly attached to said housing and extending therefrom into a medium whose temperature is to be measured; a second member, within said first tubular member, having a coefficient of thermal expansion different from that of said first tubular member, rigidly connected to said first tubular member at a point remote from said housing and extending therefrom to a point adjacent said switch; a flexible diaphragm within said housing between said switch and the end of said second member adjacent thereto, thereby forming a first compartment in which said end of said second member is located, and a second compartment in which said switch is located; means for admitting a gas into said first compartment, said means including an orifice through which said gas passes as it enters said compartment whereby said gas is expanded and cooled; means including a passageway through said second member for conducting said gas from said first compartment through said second member, thereby maintaining said second member at a substantially constant temperature despite variations in the temperature of sadi medium; and means on the end of said second member adjacent said switch, positioned to bear against said diaphragm and flex the latter to move the actuating member of said switch to operate the same.

6. A temperature actuated switch which includes: a housing; a switch mounted in said housing; a first tubular member having a relatively large coefficient of thermal expansion, rigidly attached to said housing and extending therefrom into a medium whose temperature is to be measured; a second tubular member, within said first tubular member, having a relatively small coefficient of thermal expansion, rigidly connected to said first tubular member at a point remote from said housing and extending therefrom to a point adjacent said switch, said second tubular member being rigidly held only at said point of connection to said first tubular member; a flexible diaphragm within said housing between said switch and the end of said second tubular member adjacent thereto, thereby forming a first compartment in which said end of said second member is located, and a second compartment in which said switch is located; means for admitting a gas into said first compartment, said means including an orifice through which said gas passes as it enters said compartment whereby said gas is expanded and cooled; means including a passageway through said second member for conducting said gas from said first compartment through said second member, thereby maintaining said second member at a substantially constant temperature despite variations in the temperature of said medium; and means on the end of said second member adjacent said switch, positioned to bear against said diaphragm and flex the latter to move the actuating member of said switch to operate the same.

7. A temperature actuated switch which includes: a housing; a switch mounted on said housing; a first member rigidly attached to said housing and extending therefrom into a medium whose temperature is to be measured; a second member having a coefficient of thermal expansion different from that of said first member, rigidly connected to said first member near the end of the latter and extending therefrom to a point adjacent said switch, said second member being rigidly held only at said point of connection to said first member; a flexible diaphragm within said housing between said switch and the end of said member adjacent thereto, thereby forming a closed compartment in which said switch is located; means directing a flow of cooling fluid through said closed compartment and outwardly therefrom along said second member for cooling the same; and means on said adjacent end of said member positioned to bear against said diaphragm and flex the latter to move the actuating member of said switch to operate the same.

8. A temperature actuated switch which includes: a housing; a switch mounted on said housing; a first member having a relatively large coefficient of thermal expansion, extending from said housing into a medium whose temperature is to be measured; a second member having a relatively small coefficient of thermal expansion, rigidly connected to said first member at a point remote from said switch, one of said members being rigidly connected to said housing and the other extending to a point adjacent said switch; a flexible diaphragm extending across said housing between said switch and the end of said member adjacent thereto, said diaphragm having a bearing element adapted to engage the operating element of said switch, said diaphragm thereby forming a compartment within said housing in which said switch is located, said compartment being separated from said first and second members; means directing a flow of cooling fluid from said closed compartment, along said second member for cooling the same; and cooperating means on said adjacent end of said member positioned to cooperate with said bearing element to flex said diaphragm as said adjacent end of said member is moved.

9. A temperature actuated switch which includes: a housing; a switch mounted on said housing; a first tubular member rigidly attached to said housing and extending therefrom into a medium whose temperature is to be measured; a second member, within said first tubular member, having a coefficient of thermal expansion different from that of said first tubular member, rigidly connected to said first tubular member at a point remote from said housing and extending therefrom to a point adjacent said switch; an expansion chamber within said housing having an orifice for admitting gas under pressure thereinto, said orifice and said chamber cooperating to insure the expansion and attendant cooling of said gas as it enters said chamber; means including a passageway through said second member for conducting said gas from said chamber through the interior of said second member for conducting said gas through said second member, thereby maintaining said second member at a substantially constant temperature determined by the temperature of said gas despite variations in the temperature of said medium; and means on the end of said second member positioned to bear against the actuating member of said switch to operate the latter.

GEORGE A. STARBIRD.

References Cited in the file of this patent

UNITED STATES PATENTS

| Number | Name | Date |
|---|---|---|
| 802,477 | Robertshaw | Oct. 24, 1905 |
| 988,726 | Mallory | Apr. 4, 1911 |
| 2,332,212 | Fillo | Oct. 19, 1943 |
| 2,368,926 | Jeffrey | Feb. 6, 1945 |
| 2,498,988 | Eden et al. | Feb. 28, 1950 |
| 2,565,713 | Allen | Aug. 28, 1951 |